United States Patent [19]

Basham et al.

[11] Patent Number: 4,825,500
[45] Date of Patent: May 2, 1989

[54] SPEED AND STEERING CONTROL FOR A FLOOR MAINTENANCE MACHINE

[75] Inventors: Michael T. Basham, Maple Grove; Robert M. Berdahl, Plymouth; Bruce F. Field, Minneapolis, all of Minn.

[73] Assignee: Tennant Company, Minneapolis, Minn.

[21] Appl. No.: 86,492

[22] Filed: Aug. 17, 1987

Related U.S. Application Data

[62] Division of Ser. No. 853,865, Apr. 21, 1986.

[51] Int. Cl.$^4$ .............................................. A47L 11/03
[52] U.S. Cl. .................................... 15/319; 15/50 R; 15/98; 15/320; 15/340.3
[58] Field of Search ............... 15/319, 320, 340, 50 R, 15/50 C, 98; 180/6.5

[56] References Cited

U.S. PATENT DOCUMENTS

| | | | |
|---|---|---|---|
| 3,869,749 | 3/1975 | London et al. | 15/50 C |
| 3,886,623 | 6/1975 | Landesman et al. | 15/340 |
| 3,893,530 | 7/1975 | Gordon | 15/50 R |
| 3,936,071 | 2/1976 | Ricketts | 180/79 R |
| 3,942,215 | 3/1976 | Olds | 15/340 |
| 4,492,002 | 1/1985 | Waldhauser et al. | 15/320 |
| 4,498,214 | 2/1985 | Oxel | 15/320 |
| 4,506,405 | 3/1985 | Block | 15/320 |

Primary Examiner—Harvey C. Hornsby
Assistant Examiner—Corinne M. Reinckens
Attorney, Agent, or Firm—Kinzer, Plyer, Dorn, McEachran & Jambor

[57] ABSTRACT

A drive control for a vehicle such as a floor scrubber, a floor sweeper, a pallet truck or the like, operated by a person walking or riding on a sulky behind it, includes first and second drive motors each arranged to drive a vehicle wheel. Manual means are provided whereby an operator by manipulation of a control may determine vehicle speed; forward and reverse direction; and turning right or left. A variable voltage is responsive to the operator's movements for providing an electrical signal representative of the desired speed in either the forward or reverse direction. Other movements by the operator of the control provide turning in the right or left direction. The means for detecting a turning control signal from the operator is effective to reduce the motor drive signal to the motor on the inside of the desired turn, from the level representative of the existing speed toward a no-speed level at a programmed rate. The control further includes a proximity reverse sensing means effective to stop reverse movement of the vehicle upon sensing the presence of an operator closely adjacent the rear of the vehicle and for providing a short burst of forward movement of the vehicle upon such detection. The control further can provide signals to control operative functions of the controlled vehicle which may be affected by speed or direction of the vehicle.

1 Claim, 4 Drawing Sheets

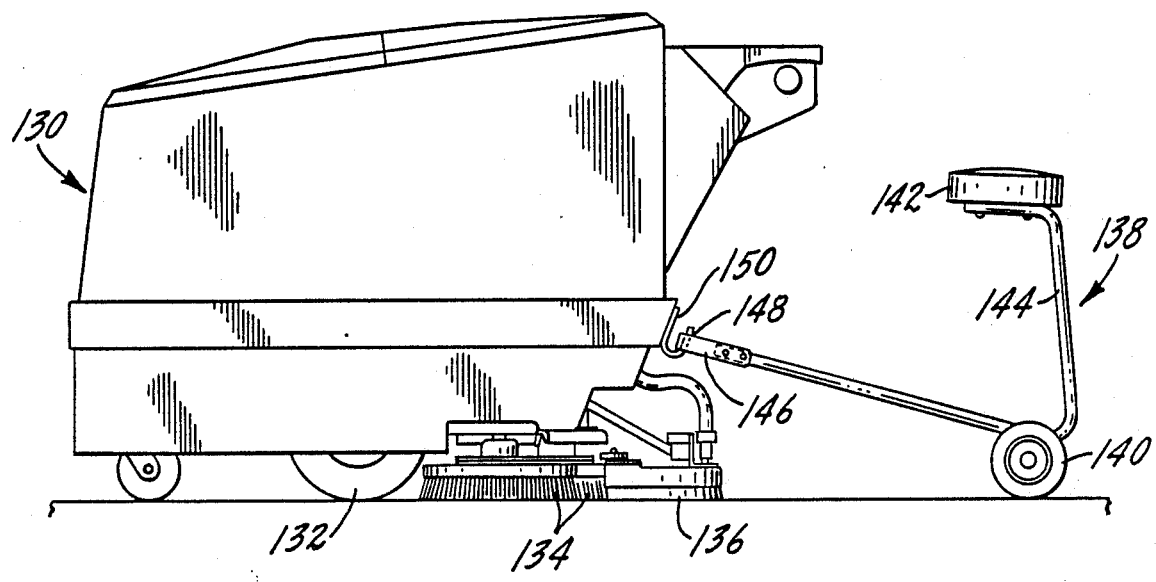

SPEED AND STEERING CONTROL FOR A FLOOR MAINTENANCE MACHINE

This is a division of application Ser. No. 853,865, filed Apr. 21, 1986.

SUMMARY OF THE INVENTION present invention relates to a drive control for a vehicle for use by an operator walking behind it, for example a scrubber or sweeper or pallet truck, and has particular relation to a simplified and reliable control for travel speed and power assisted steering.

A primary purpose is a drive control of the type described which provides power assisted steering whereby an operator walking behind a vehicle can manipulate it with a minimum of effort.

Another purpose is a drive control of the type described which is applicable to both walk-behind vehicles and vehicles having an articulated or sulky-type operator support.

Another purpose is a steering control of the type described suitable for use in a vehicle operated by an operator walking behind it in which the control circuit is position sensitive and responds to the operator's commands by repositioning the machine to reduce the control force applied by the operator to zero.

Another purpose is a self-propelled walk-behind machine of the type described which permits control by one hand.

Another purpose is a power assist steering arrangement for a vehicle which has great sensitivity to small forces applied to the steering controls.

Another purpose is a control system of the type described utilizing a single drive motor for each of the vehicle wheels and in which turning is provided by progressively reducing the speed of on wheel relative to the other.

Another purpose is a steering control which is load sensitive and which provides a feedback whereby the machine positions itself to reduce the control force applied by the operator to zero.

Another purpose is a drive control of the type described including a proximity sensor effective when the machine is traveling in reverse to sense the position of an operator's body directly adjacent the rear of the machine and to provide an automatic cutout of any further reverse movement while at the same time applying a small amount of forward movement to move the machine away from the operator.

Another purpose is a drive control of the type described utilizing a single potentiometer in which a portion of the range of the potentiometer provides a control signal indicative of forward movement; another portion of the range provides a deadband indicative of a neutral condition; and another portion of the potentiometer range provides a control signal indicative of speed in the reverse direction, thereby eliminating the cost and complexity of a separate switching means for commanding reverse movement.

Another purpose is a simplified control for use by operators of walk-behind vehicles providing extremely sensitive and reliable control of both speed and machine direction.

Other purposes will appear in the ensuing specification, drawings and claims.

BRIEF DESCRIPTION OF THE DRAWINGS

The invention is illustrated diagrammatically in the following drawings wherein:

FIG. 4 is a side view of a vehicle of the type shown in FIG. 1 with an articulated sulky for supporting the operator.

DESCRIPTION OF THE PREFERRED EMBODIMENTS

In many prior control devices where a control movement by the operator results in a proportional steering displacement, the steering control is effective when the operator is in a fixed position, either sitting or standing, directly on the machine being controlled. In this arrangement, the physical position of the operator is fixed relative to the machine and a steering command is not influenced by relative changes in position between the operator and the machine. However, where the operator is walking behind a self-propelled machine of sufficient weight to require power assisted steering, prior steering control devices have not been adequate. Due to the forward motion of the machine and the irregular pace of the operator, control of steering through a position control lever provides erratic control that is uncomfortable to the operator because the machine's motion is not synchronized with that of the operator. This repeatedly results in a force created between the operator and machine which is tiring to the operator.

The present invention provides a form of steering control as well as a speed and reverse/forward direction control which is extremely sensitive and responsive to a relatively small force applied by the operator to the control elements. The machine responds, particularly in steering, by positioning itself to reduce the force created between the operator and the machine to zero. The steering control is position sensitive as it tends to self correct in that as the operator applies a force to steer in one direction, the machine will tend to reduce that force to zero. The steering control is quite gradual and progressively reduces the speed of one of the two wheels, depending upon the direction of turn, from a starting point which is the existing speed of the wheel. The reduction is at a programmed time rate, for example as controlled by an RC (resistance-capacitance) time constant. The reduction is toward zero, although the speed of the inside wheel may not reach zero if the operator releases the turning control prior to that time. The principle of a steering control which is self-correcting, as described, is applicable to both a walk-behind vehicle, as shown in FIG. 1, and a vehicle with an articulated sulky to support the operator, as shown in FIG. 4.

Figure 1:
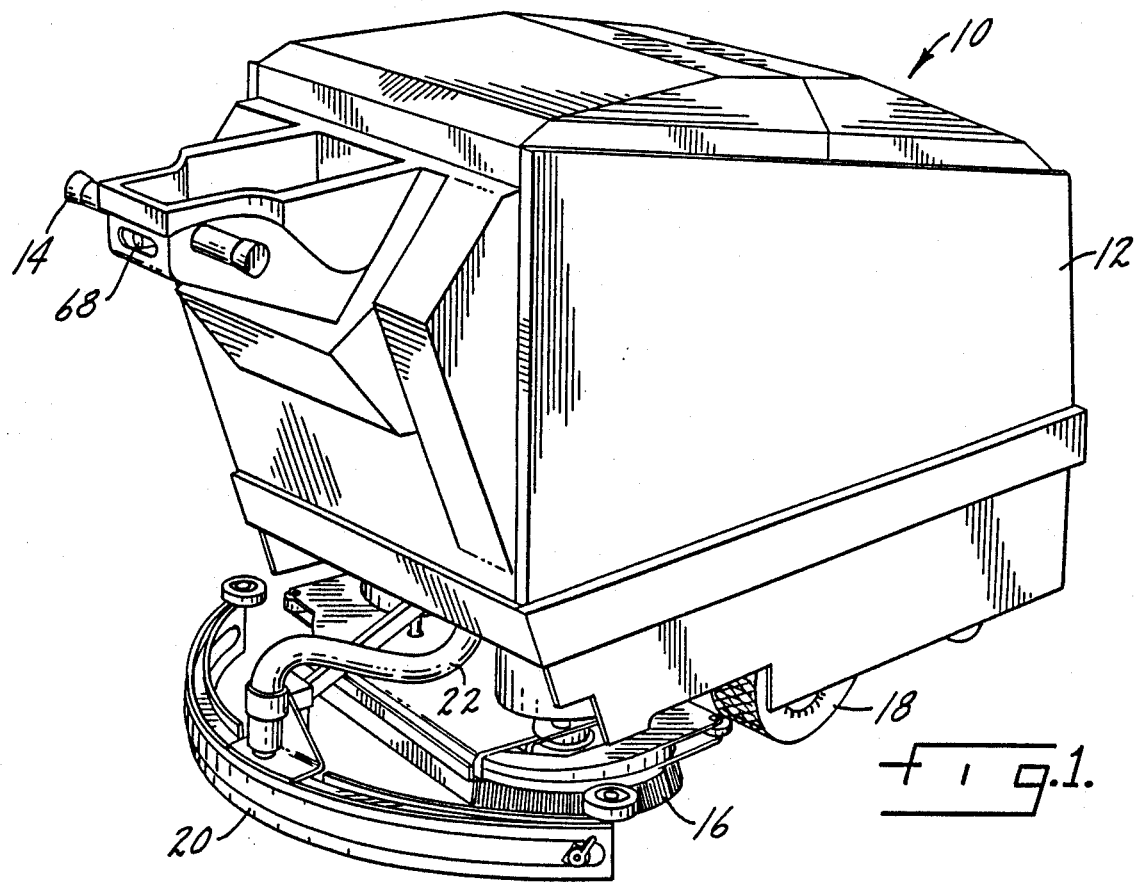
FIG. 1 is a perspective of a vehicle of the type described in the form of a floor maintenance machine, specifically a scrubber.

In FIG. 1, a vehicle typified as a scrubber is indicated generally at 10 and may be of the type manufactured by Tennant Company, of Minneapolis, Minnesota, assignee of the present invention, or a subsidiary, Tennant Trend, Inc. of Niagara Falls, N.Y. The scrubber may include a housing 12, and rear operating control 14 which is used by the operator to control speed and direction. There may be a pair of rotating brushes, one of which is indicated at 16, and one of the two drive wheels for the vehicle is indicated at 18. A squeegee 20 is normally positioned at the rear of the vehicle and is effective, as is known in the art, to squeegee the floor and remove any standing water. Normally, there will be a vacuum device attached to the squeegee which will apply suction to standing water collected by the squeegee. The vacuum hose is indicated at 22. A proximity sensor 68 is positioned at the rear of housing 12 and may be of a capacitance type which will sense the presence of the operator if the operator comes too close to the machine. This will be described in more detail hereinafter.

Although the invention will be described in connection with a scrubber, it should be clear that the control has application to other types of vehicles that are controlled by an operator walking or riding behind the machine and are propelled by two electric motors, such as battery powered pallet trucks and sweepers and so should not be limited to a scrubber.

Figure 2:
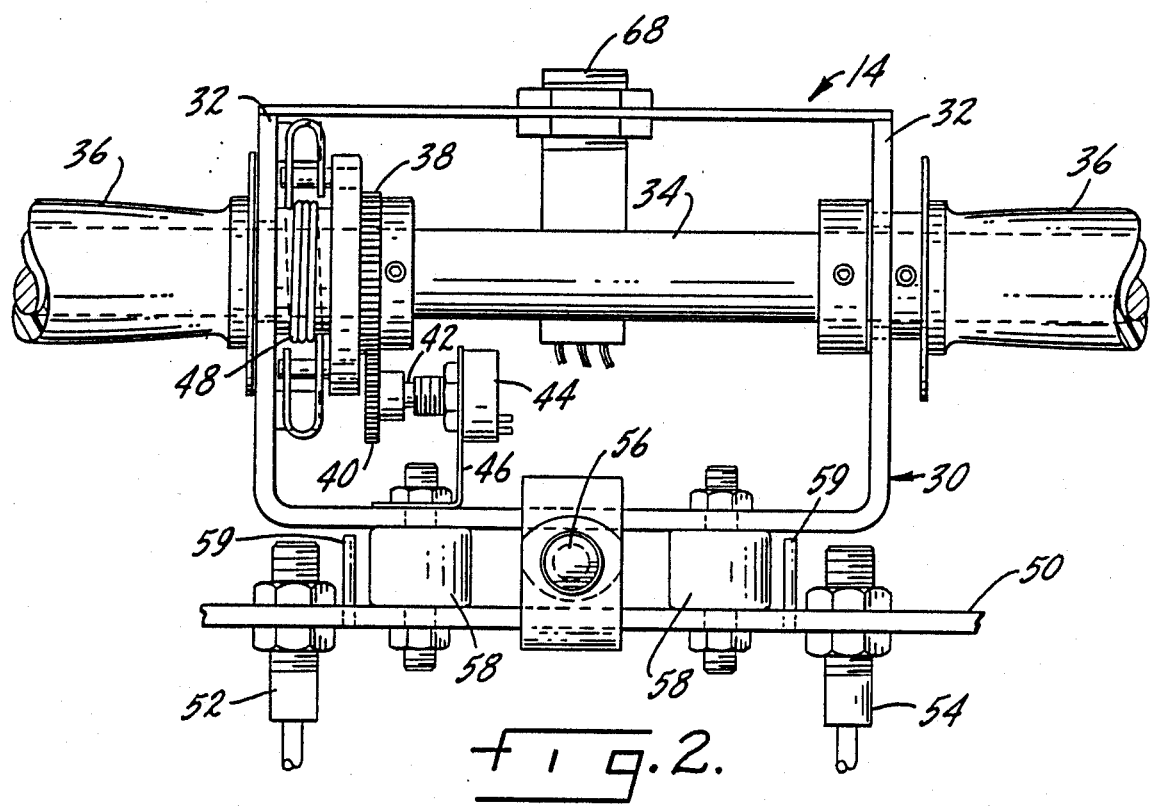
FIG. 2 is a top view of the operator controls, FIGS. 3A and 3B together provide a block diagram of the drive control for the vehicle of FIG. 1.

FIG. 2 illustrates an operator control 14 which is positioned at the rear of the machine and used by the operator to control speed and direction. A bracket 30 is suitably attached to the rear of the machine at a comfortable height for the operator and has rearwardly extending arms 32 which support a rotatable shaft 34 having hand grips 36 on the outside ends thereof. Positioned on shaft 34 between the bracket arms 32 is a gear 38 which is in mesh with a smaller gear 40 fastened to a shaft 42 extending outwardly from potentiometer 44. Potentiometer 44 may be mechanically held in position on bracket 30 by means of an angle support 46. A dual throw coil spring 48, similar to those used in door knobs, is mounted about shaft 34 and is arranged to always return it to a predetermined stationary position which, as will be described hereinafter, effectively places the machine drive in neutral.

Mounted ahead of bracket 30 is a support member 50 which has a pair of proximity switches 52 and 54 mounted on opposite sides of a central pivotal support 56 and directly ahead of and spaced slightly away from the forward side of bracket 30. Adjacent each of the proximity switches there is a rubber mounting 58 which provides a light resistance to pivotal movement of the hand grips. These center the control when no force is being applied and provide a "feel" to the steering. Two fixed stops 59 limit the degree of pivotal movement of bracket 30.

The proximity switches 52 and 54 may advantageously be eddy current switches, which are economical and reliable. However, a person versed in the art will recognize that these switches could be any of several other types of non-contact switches, and also that mechanical switches requiring contact to operate them could be used. The latter are less reliable and not preferred. However, the invention is broad enough to envision using any suitable type of switch giving an on-off output.

In operation, shaft 34 through its hand grips 36 will be rotated in the forward direction to cause the machine to move forward with the degree of rotation providing an output voltage from potentiometer 44 consistent with rotation of the shaft. Rotation of shaft 34 in the reverse direction will cause the machine to move in a backward direction. When the operator wishes to turn to the right or left, he pivots bracket 30 about its pivotal connection 56 to support 50 so as to move the front of the support bracket toward one or the other of the proximity switches 52 and 54, depending upon the desired direction of turn. There is no contact between the bracket and the proximity switches, but rather a slight lessening of the distance between a switch and the bracket will cause the proximity switch to close sending out an electrical turn signal described in connection with the circuit of FIGS. 3A and 3B. Thus the operator, by using one or both hands, may simply rotate shaft 34 in the forward or reverse direction or pivot the shaft about its central pivot point to provide all of the necessary speed and direction controls for the vehicle.

Figure 3A:
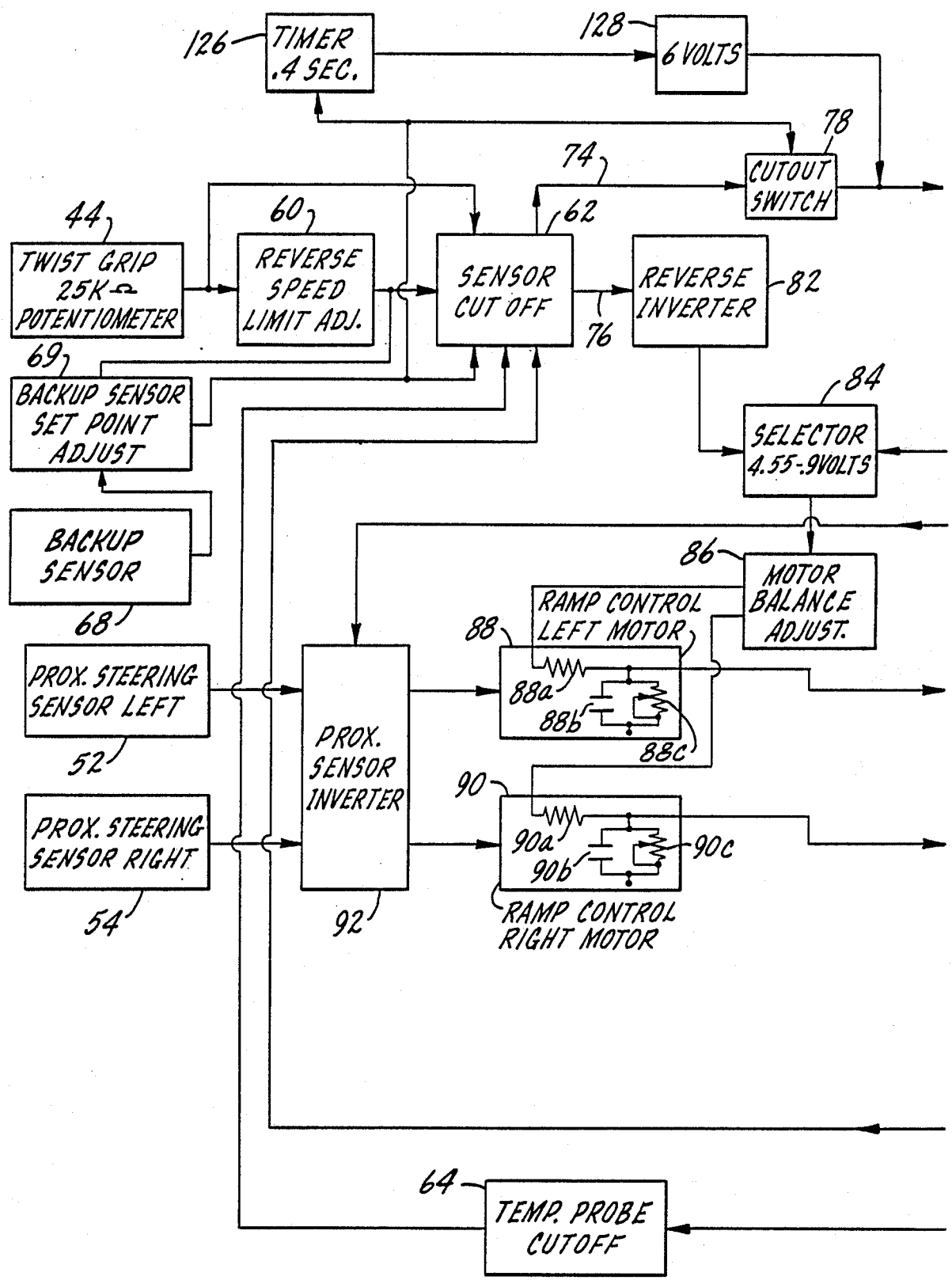
Figure 3B:
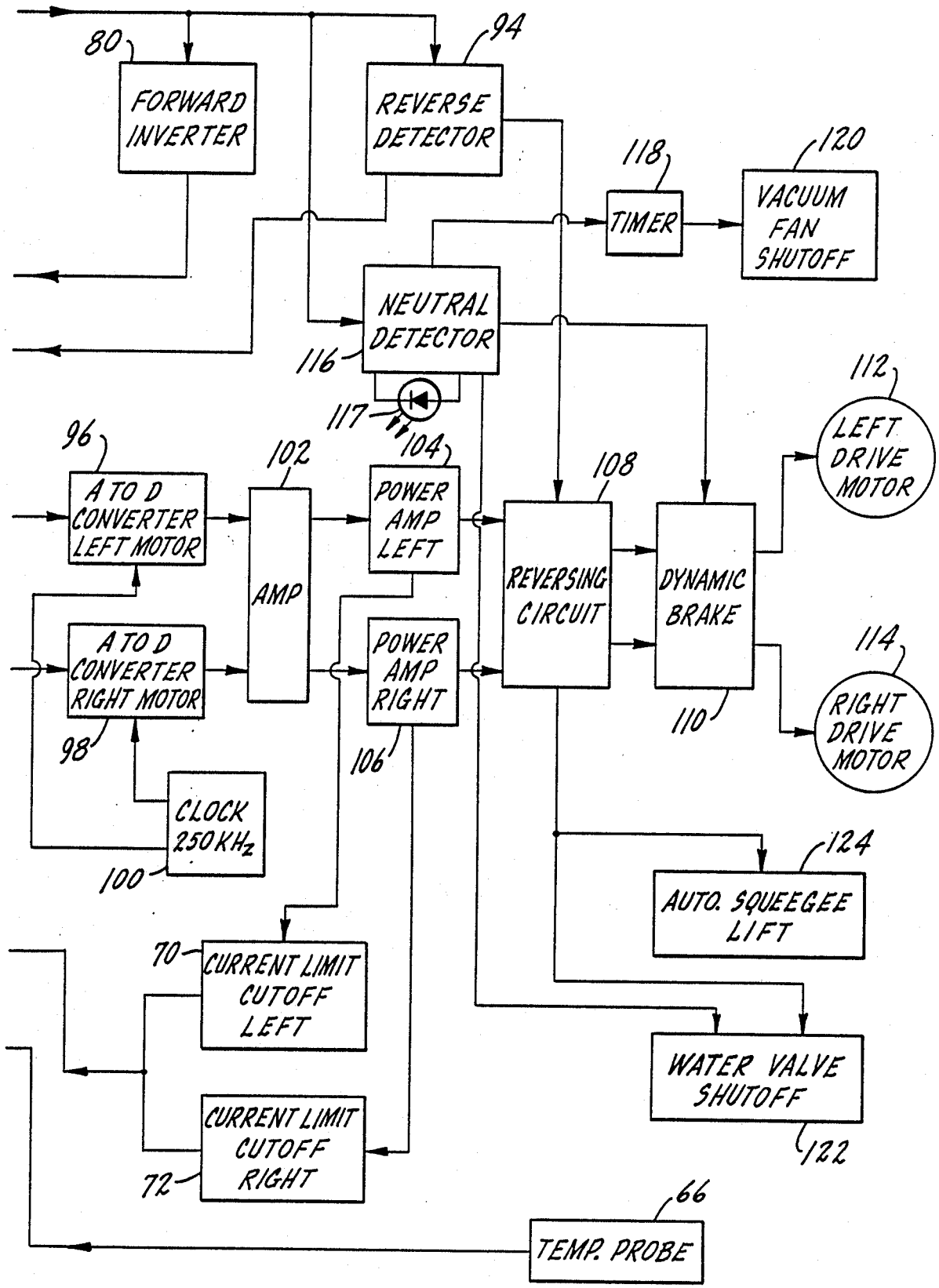

In FIGS. 3A and 3B, potentiometer 44 is illustrated at the upper left-hand portion of the drawing and provides a voltage output which is dependant upon the amount and direction of rotation of shaft 34. Although a potentiometer is described as the means for providing a variable voltage responsive to handle rotation, devices such as a Hall effect transducer or a photoelectric device may also be acceptable. The potentiometer does not provide a voltage output of different polarity depending upon the direction of rotation of shaft 34, but rather provides an output voltage which differs in magnitude. Specifically, that portion of the potentiometer range having an output voltage of from 0 to approximately 4 volts is indicative of movement in the reverse direction, with the highest voltage being indicative of the lowest reverse speed. There is a deadband between 4 and approximately 4.2 volts which is the neutral position of the machine drive. When the potentiometer is so positioned, shaft 34 is at rest and the machine will be stationary. An output voltage from potentiometer 44 of from approximately 4.2 to 8 volts is indicative of movement in the forward direction, with the greater the voltage the faster the desired speed.

Connected to potentiometer 44 is a reverse speed limit adjust circuit 60 which is a variable resistance, normally adjusted at the factory, to limit speed in the reverse direction. The output from reverse speed limit circuit 60 is connected to a sensor cutoff circuit 62 which also has an input directly from potentiometer 44. Thus, the sensor cut-off circuit 62 receives both an analog signal representative of reverse speed, as limited by circuit 60, and a similar signal representative of forward speed limited only by the maximum voltage output of the potentiometer. Sensor cut-off 62 also receives inputs from a temperature probe cut-off circuit 64 which is responsive to a temperature probe 66 effective to sense overheating of any of the drive elements of the machine. A second input to sensor cut-off 62 is provided by backup sensor 68 positioned on the rear of the machine. The third input for sensor cut-off 62 is provided by a pair of current limit cutoff switches indicted at 70 and 72 which function to shut the machine down in the event that motor current exceeds a predetermined limit. Any one of the cut-off inputs, if indicating an improper condition, will cause circuit 62 to inhibit machine movement. Assuming that no inhibit signal is provided by the current limit switches or the temperature probe or the backup sensor, sensor cut-off 62 will provide one output on line 74 representative of forward speed and a second output on line 76 representative of speed in the reverse direction. It may also provide no output, representative of a neutral speed condition. The speed signals are differentiated by their analog voltage amplitudes.

A cutout switch 78, forming a part of the backup sensor control, is connected between output line 74 of sensor cut-off 62 and a forward inverter 80 which functions in a manner similar to a reverse inverter 82 which is connected to line 76. The input to forward inverter 80 will be an analog voltage between 4.2 and 8 volts, depending upon the degree of rotation of shaft 34 in a forward direction. This voltage is converted by the forward inverter to a voltage in the range of 0.9 to 4.55 volts, with the 0.9 volt limit being equivalent to an 8 volt input and the 4.55 volt limit being equivalent to a 4.2 volt input. Similarly, reverse inverter 82 will convert the input analog voltage of 0 to 4 volts, representative of rotation of shaft 34 in the reverse direction, to the same output range of 0.9 to 4.55 volts. Again, the maximum speed will be represented by the lower voltage.

The outputs of inverters 80 and 82 are connected to a selector circuit 84 which receives the same range of input voltage from each of the inverters. The selector will select the lowest input voltage which is indicative of the highest speed and in this way differentiates between desired movement in the forward or reverse directions. For example, a signal of 0.9 volt from forward inverter 80 means maximum speed in the forward direction. At the same time, the voltage from reverse inverter 82 would be 4.55 volts indicative of zero speed in the reverse direction and thus selector 85, having selected the lowest input voltage, would provide an output voltage indicative of maximum forward speed.

The output from selector 84 is connected to a motor balance adjustment 86 which may be a factory adjustment to take into account variations in the parameters between the two drive motors. The output from motor balance adjustment 86 is connected to a left motor ramp control 8 and a right motor ramp control 90.

Proximity switches 52 and 54 are indicated in FIG. 3A and the proximity switches provide either an on or off signal to proximity sensor inverter 92. If the vehicle is moving in the forward direction and a steering command is given, that command will be passed directly through inverter 92 to one or the other of the two ramp control circuits. On the other hand, if machine travel is in the reverse direction, it is necessary to invert the control information provided by the two proximity sensors. Whereas, normally a closing of left sensor 52 would provide an on signal to left ramp control 88, when the machine is in the reverse direction, a closure of left sensor 52 will provide an on signal to right ramp control 90. The proximity sensor inverter 92 is controlled by a reverse detector 94 which is connected to potentiometer 44 and is effective to determine whether the potentiometer output signal is indicative of forward or reverse movement. Thus, the proximity sensor inverter will either invert or not invert, depending upon whether movement of the vehicle is in the forward or reverse direction.

Ramp control circuit 88 includes a resistance 88a and the parallel combination of a capacitor 88b and a variable resistance 88c. Resistance 88a and capacitor 88b provide a conventional RC (resistance-capacitance) time constant circuit which controls the time and rate by which a signal indicative of motor speed from balance adjust 86 is reduced from a particular speed down to zero, with this reduction being triggered by the closure of a proximity switch and being used in controlling steering of the vehicle to the right or to the left. Resistance 88c controls the rate at which capacitor 88b charges after the proximity switches both return to the normally open position. Thus, return to speed of the wheel slowed during turning is not abrupt, but gradual. Resistance 88c is an adjustable resistor which can be used to factory adjust the rate at which the wheel returns to speed. Ramp control 90 has the same set of resistance and capacitive elements, given like numbers. In application, the input voltage to a ramp control will be low for high speed and gradually increased toward a high voltage representative of zero speed. Obviously, the invention should not be so limited.

The output from ramp control circuits 88 and 90 is an analog signal indicative of the desired motor speed for the left and right vehicle wheels. If no turn is indicated, the two motor speed signals will be equal. If a turn has been required by the closing of one of the proximity switches, the analog signal at the output of one or the other of the ramp control circuits will be gradually ramped toward a voltage indicative of no speed. Both output signals are connected to analog to digital converters 96 and 98, respectively, which will take the analog input voltages and will provide a digital output representative thereof. The analog to digital conversion rate is controlled by a 220 kHz clock 100 connected to both converters 96 and 98.

The output from the two converters is connected to a current amplifier 102 with the output from current amplifier 102 being connected to left and right power amplifiers 104 and 106. The current limit to which cutoff switches 70 and 72 respond are determined in power amplifiers 104 and 106. The output from the two power amplifiers is connected to a reversing circuit 108 receiving its operating condition signal from reverse detector 94. If speed of the vehicle is to be in the forward direction, the outputs of the two power amplifiers will pass directly through the reversing circuit and the dynamic brake 110 and then to the left drive motor 112 and the right drive motor 114. On the other hand, if the machine is to be moved in the reverse direction, the output of the reversing circuit will be of opposite polarity from the input so as to drive the drive motors in the opposite direction. Both drive motors respond to pulse width modulation for speed control.

It should be noted that the inputs to the two ramp control circuits is the same voltage indicative of speed in either a forward or a reverse direction. If no steering control is provided, these voltages will be passed directly to the analog to digital converters for subsequent application of the same drive signals to each of the vehicle motors. In the event that a turning movement is indicated, one or the other of the ramp control circuits will start its voltage ramp at the existing speed of the wheel whose speed will be reduced to effect the turn. The reduction in speed and return to speed upon completion of a turn are gradual, which provides smooth easy control for the operator.

A neutral detector 116 is connected to the output of potentiometer 44 through the sensor cut-off 62 and cut-off switch 78, with the input to the neutral detector, in the example described, being a voltage of between 4 to 4.2 volts when shaft 34 is in the neutral position indicative of no movement for the vehicle. Connected to the neutral detector is a timer 118 and a vacuum fan shut-off 120. Thus, after a short interval of time necessary to remove any standing water, when the machine is in the neutral or non-moving position the vacuum fan does not operate.

Also connected to the neutral detector is a water valve shutoff 122 whereby the water valve used to supply the cleaning solution will be shut off when the machine is not moving. Similarly, an automatic squeegee lift circuit 124 is connected to reversing circuit 108 whereby the squeegee is automatically lifted whenever the machine moves backward, as otherwise there is the possibility of damage to the squeegee.

Also connected to the neutral detector 116 is an LED (light-emitting diode) 117 for facilitating installation of potentiometer 44. The LED will light when the voltage range is in the neutral deadband of 4.0 to 4.2 volts. An installer can thus readily position potentiometer 44 so its neutral corresponds to the neutral position of spring 48.

Dynamic brake 110 is also connected to neutral detector 116 whereby the machine is automatically braked when there is no indication from the operator to move in the forward or reverse direction. When the machine is in neutral, the motors are effectively functioning as generators with the result that although the machine may move, such movement will be slowed down. This is a useful feature to aid in controlling the vehicle speed when traveling down a ramp. The dynamic brake will also be applied in a turn to the motor which is on the inside of the turn when its voltage reaches zero. This functions to further tighten the turn and thus increases the maneuverability of the vehicle. This is especially useful in a vehicle having a high polar moment of inertia about the turning axis.

Backup sensor 68 is positioned at the rear of housing 10 and is mounted on a strap attached to bracket 30. It is a capacitance type sensor effective to react to the presence of a human body closely adjacent to it. The backup sensor functions to stop reverse movement in the event that the operator has come too close to the machine when it is moving in a reverse direction as might come about if the operator was against a wall and the machine was moving backward toward him. Connected to the backup sensor, in addition to the connection with sensor cut-off 62, is a timer 126, for example a 0.4 second timer, which in turn is connected to a 6 volt supply indicated at 128. Voltage source 128 is connected to the output side of cut-off switch 78. The result of this combination of elements and circuits is that when the backup sensor indicates the presence of the operator too close to the rear of the machine, sensor cut-off 62 stops reverse movement of the machine. Timer 126 will cause source 128 to supply a 6 volt signal for approximately 0.4 second to forward inverter 80 with the result that there will be a forward movement of the machine for that period of time which will cause the machine to move away from the operator. Backup sensor set point adjust 69 acts when the vehicle is in reverse. It monitors the reverse speed and when that speed exceeds a predetermined value, it will allow the backup sensor 68 to activate the sensor cut-off 62. This provides the operator will full maneuverability at slow reverse speeds, but prevents higher speeds where injury to the operator might occur. The predetermined set point value can be pre-set at the factory.

Although the backup sensor has been described in connection with a vehicle having steering control, it should be understood that it may be utilized in a machine without accompanying steering, or there may be steering in some other manner.

The effect of the temperature probe cut-off 64 and the current limit cut-offs 70 and 72, as well as the backup sensor 68, is to return the machine control to a neutral condition. The most likely cause of an overload, which might be recognized either by the current limit sensor or by the temperature probe, is if the machine was going up a steep ramp such that there would be an overload on the motors. Although the operator may hold the machine in an operating condition, the sensor cut-off will return the machine to an effective neutral condition because it will not permit operation of the drive motors when any of the sensors indicate a malfunctioning condition. When the machine returns to neutral, the dynamic brake operates to keep it from rolling rapidly back down the ramp.

The effect of the drive control circuit described on a walk-behind vehicle is to provide power steering for the machine such that the effort required by the operator is essentially similar to that required to move a conventional shopping cart. The operator walks behind the machine and by simple rotation of the twist grip controls direction and speed, that is either moving in the forward or reverse direction at a desired speed. When the operator pivots the handle, closing one of the proximity switches, one of the motors slows down and the machine tends to turn and move away from the operator's force which caused the initial closure of the proximity switch. Thus, turning movement is gradual. The operator may apply a further switch closing motion to the pivotal handle and, if so, turning will continue. But again, it is gradual, both because the movement of the machine away from the operator causes the proximity switch to open and also because the reduction in wheel speed of the inside wheel is gradual. The reduction in wheel speed begins at the existing speed of the wheel and is reduced toward zero at a time and rate determined by the RC time constant of the ramp control circuits. A different time constant controls gradual return of the inside turning wheel back up to speed. It has been found that for a natural feel in turning, the wheel should speed back up faster than it slows down.

FIG. 4 illustrates a scrubber or other type of floor or surface maintenance vehicle which provides an articulated sulky to support the operator. A vehicle 130, which again is shown as a scrubber, has drive wheels 132, rotating scrubbing brushes 134 and a squeegee 136, as in the embodiment of FIG. 1. A sulky 138 having a pair of wheels, one of which is shown at 140, provides a seat 142 for an operator. Seat 142 is supported on a bracket 144 which may include a forwardly-extending yoke 146. Yoke 146 is pivoted at 148 to a hook 150 or any type of support which will provide an articulated connection between the operator sulky and the floor maintenance machine.

Because sulky 138 is pivotally connected to machine 130, the drive and power steering control will respond in the same manner as in a walk-behind machine. The operator application of control pressure on the twist grip control is the same in both instances. This also would be true if the articulated sulky actually supported some of the weight of the vehicle, which is not the case in the FIG. 4 embodiment.

Although the operator's control is shown as a single shaft, with handles on either side thereof, and with rotation being effective to cause movement in the forward or reverse directions, other forms of operating handles may also be satisfactory. Instead of a handle having its rotational axis in a horizontal plane, it may be possible to utilize a handle with its axis in the vertical plane. Similarly, although a single shaft has been found to provide the best form of manual control, in some applications the shaft may be split to provide independent handles.

Whereas the preferred form of the invention has been shown and described herein, it should be realized that there can be many modifications, substitutions and alterations thereto.

The embodiments of the invention in which an exclusive property or privilege is claimed are defined as follows:

1. A drive control for a floor maintenance scrubber having a squeegee and means for raising it, a vacuum fan and means for shutting it off, and a scrub water supply and means for shutting it off, motor drive means arranged to drive the scrubber wheels, operator controls for providing electrical signals representative of forward, reverse and neutral movement of the scrubber, means for translating said forward, reverse and neutral movement signals into motor drive signals, the means for raising said squeegee being connected to and responsive to the signal indicating reverse movement of the scrubber, the means for shutting off the vacuum fan being connected to and responsive to the signal indicating a neutral condition for the scrubber, a timer connected to said vacuum fan shutoff and delaying operation thereof for a predetermined time after the scrubber is in a neutral movement condition, and the means for shutting off the scrub water supply being connected to and responsive to the signal indicating a neutral condition for the scrubber.

* * * * *